(12) United States Patent
King

(10) Patent No.: US 6,253,709 B1
(45) Date of Patent: Jul. 3, 2001

(54) AUTOMATIC WATERBOWL FOR PETS

(76) Inventor: Wayne King, 498 Rotonda Cir., Rotonda West, FL (US) 33947

( * ) Notice: Subject to any disclaimer, the term of this patent is extended or adjusted under 35 U.S.C. 154(b) by 0 days.

(21) Appl. No.: 09/395,136

(22) Filed: Sep. 13, 1999

(51) Int. Cl.$^7$ .............................. A01K 7/00; F03D 9/00
(52) U.S. Cl. .................................................. 119/74; 4/341
(58) Field of Search ............................ 119/51.5, 74, 174, 119/161, 162; 4/301, 340, 341, 311

(56) References Cited

U.S. PATENT DOCUMENTS

| | | | |
|---|---|---|---|
| 363,494 | * 5/1887 | White et al. | 4/341 |
| 2,049,534 | * 8/1936 | Byerlein | 4/341 |
| 5,301,374 | * 4/1994 | Smiley | 4/341 |

* cited by examiner

Primary Examiner—Thomas Price
(74) Attorney, Agent, or Firm—Frank A. Lukasik

(57) ABSTRACT

An automatic pet watering device installed on the toilet bowl of a conventional toilet, consisting of a conventional toilet bowl having a top cap connected to an outlet for releasing water, a hollow tube extending from the top cap and above the water line and through the toilet bowl and having an end portion bent in a downward position, a water bowl located near the toilet bowl below the hollow tube, the water bowl having an open end and a bottom end, the first end of the water tube connected to the bottom of the water bowl and extending vertically and connected through the toilet bowl and bent downwardly to a point below the water line of the toilet bowl.

2 Claims, 3 Drawing Sheets

AUTOMATIC WATERBOWL FOR PETS

BACKGROUND OF THE INVENTION

1. Field of the Invention

This invention relates to providing water for pets and more particularly to an automatic watering device connected to a toilet bowl.

2. Description of the Prior Art

It is common for pets, when left alone, to drink from toilet bowls. This practice subjects pets and their owners to contamination from the bacteria within the toilet bowl. In some cases, the pet can fall into the toilet bowl and drown. Pet owners' attempts to keep the pet (especially in the case of larger canines) from drinking from the bowl by keeping the lid down, are often thwarted by the animals' ability to lift the lid in order to drink.

The prior art includes a limited number of devices for attachment to a conventional toilet bowl or toilet seat for cleaning and irrigating the anal and/or genital areas of a user. Examples of such prior art bidet attachments are shown and described in U.S. Pat. No. 5,142,711 to Parikh, U.S. Pat. No. 5,101,520 to Lockhart, U.S. Pat. No. 5,090,067 to Cogdill, U.S. Pat. No. 3,045,248 to Gentry, and U.S. Pat. No. 3,195,148 to Merkel, Jr.; each of which discloses an attachment or assembly for mounting either on the upper surface of a toilet bowl or the under surface of a toilet seat for cleansing and irrigating the anal and/or genital areas.

SUMMARY OF THE INVENTION

The instant invention is not a bidet. It is an automatic watering device which is separate from, yet connected to the water supply and drainage system of a common toilet. By drawing from the water supply of the toilet, the watering device is replenished whenever the flushing system of the toilet is activated and by the virtue of its connection at its lowest point by an "S" shaped tube to the drainage side of the toilet, it is simultaneously drained. The "S" shaped tube, by acting as a buffer between the water level in the toilet bowl and the level in the watering device, permits the watering device to refill to its operational level and prevents back-flow contamination of the pet's drinking water.

The instant invention requires, for its installation, only minor modifications to an existing toilet. Two small holes are used as inlet and drain holes respectively, and standardly available flexible tubing can be affixed into the holes and sealed with modern sealing adhesives. The bowl portion of the watering device can be mounted by various attachment means in location adjacent to the existing toilet.

The instant invention provides a unique and cost-effective method of providing fresh drinking water for pets. Unlike conventional water containers, which can be overturned or otherwise emptied, the watering device described herein provides a stable and clean watering means to household pets. The invention is easily installed on an ordinary household toilet.

It is therefore an object of the present invention to provide an automatic pet watering device.

Another object of the invention is to provide an automatic pet watering device which can be easily installed on the toilet bowl of a conventional toilet.

It is another object of the present invention to provide an automatic pet watering device which is simple and inexpensive to manufacture and install.

These objects as well as other aspects, objects and advantages of the present invention will become apparent to those skilled in the art after reading the following description of the preferred embodiments in conjunction with the accompanying drawings, and the appended claims.

DESCRIPTION OF THE PREFERRED EMBODIMENT

Figure 1:
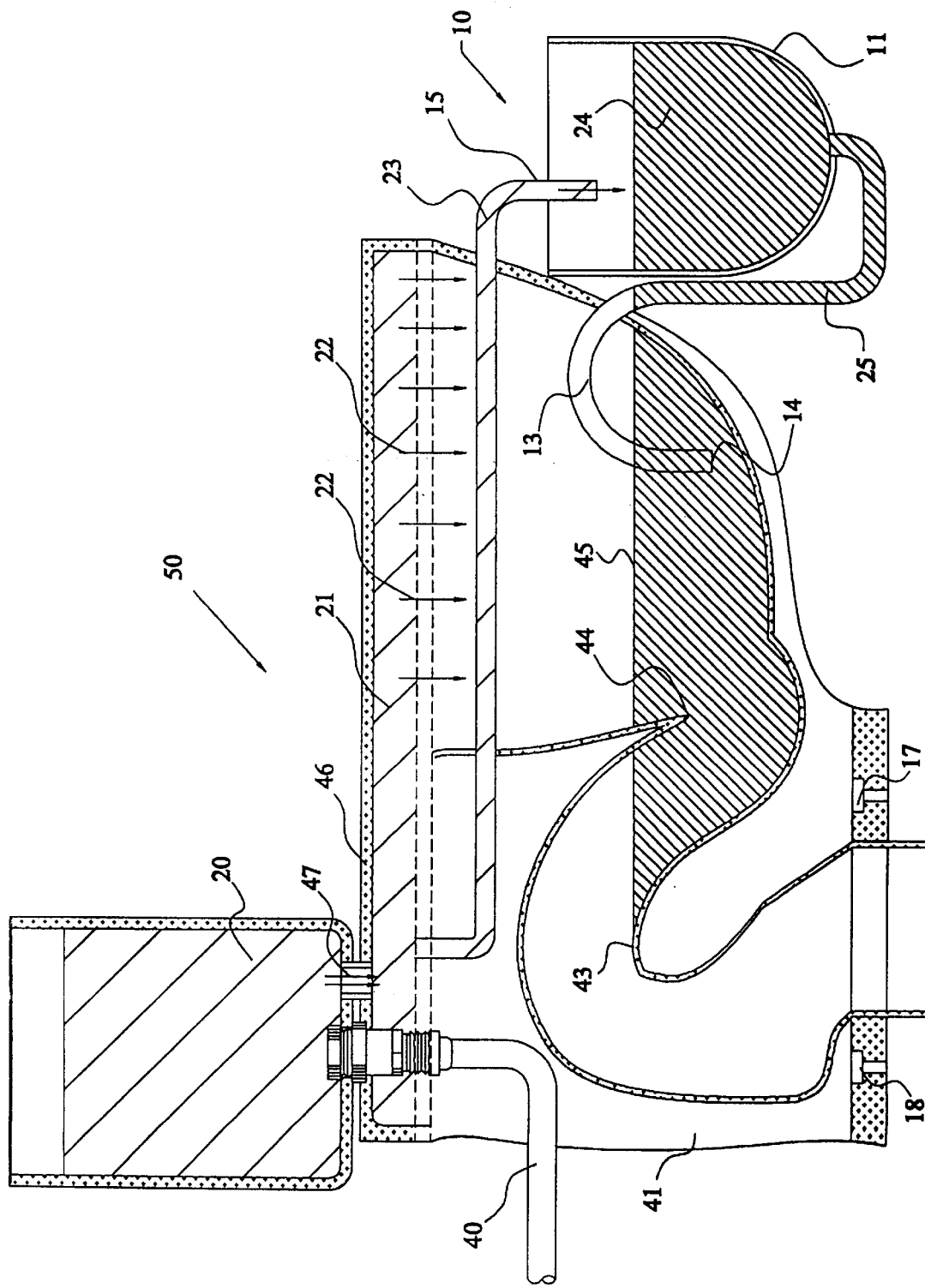
FIG. 1 is a side view, partly in section, of an automatic pet watering device in accordance with the invention.

Referring now to the drawings, wherein like numerals designate like and corresponding parts throughout the several views, numeral 50 generally designates a typical water closet toilet which is installed in most bathrooms and the watering device of the invention is designated overall with the numeral 10. Inlet tube 40 supplies water 20 which is discharged during normal flushing through aperture 47 through top cap 46. Water 21 then flows down as shown by arrows 22 down into position as water 45. Lips 43 and 44 control the eventual water level 45. During the flushing, water 23 flows down through tube 15 to fill waterbowl 11. Water 24 is maintained at the same level as water level 45 by reason of its flowing during filling through trap tube 13 and outlet 14. By reason of the natural behavior of water, once the water level 45 has been reached, no further water can flow through trap tube 13 and water level 24, 25 and 45 reach equilibrium. The equilibrium thus described is achieved by reason of the relationship between water level 45 as set by lip 43, the height of trap tube 13 and watering device 10 and the cessation of water flow 21 simultaneously to both the toilet bowl 41 itself and through tube 15 to the watering device 10.

Drainage from watering device 10 is not dependent entirely upon the siphoning effect caused by a reduction of water level 45 because water flow 23 into the watering device 10 will effectively flush water 24 through trap tube 13 until water 20, 21, and 22 cease to flow.

Figure 2:
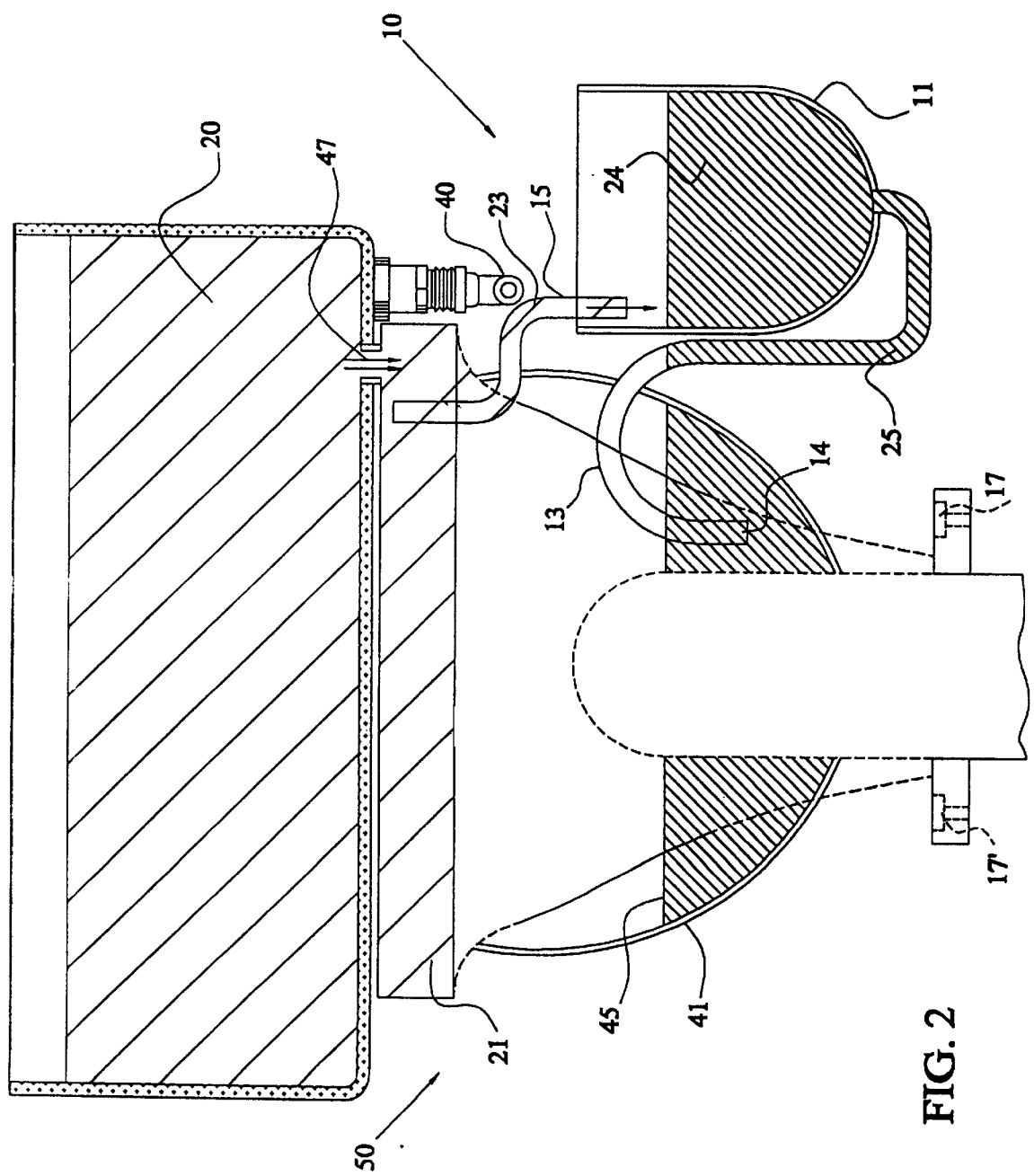
FIG. 2 is a rear view, partly in section, of an automatic pet watering device in accordance with the invention.

Referring now to FIG. 2, wherein the operational position of watering device 10 is shown adjacent to the side of the toilet bowl 41. This is the more usual location for watering device 10.

Figure 3:
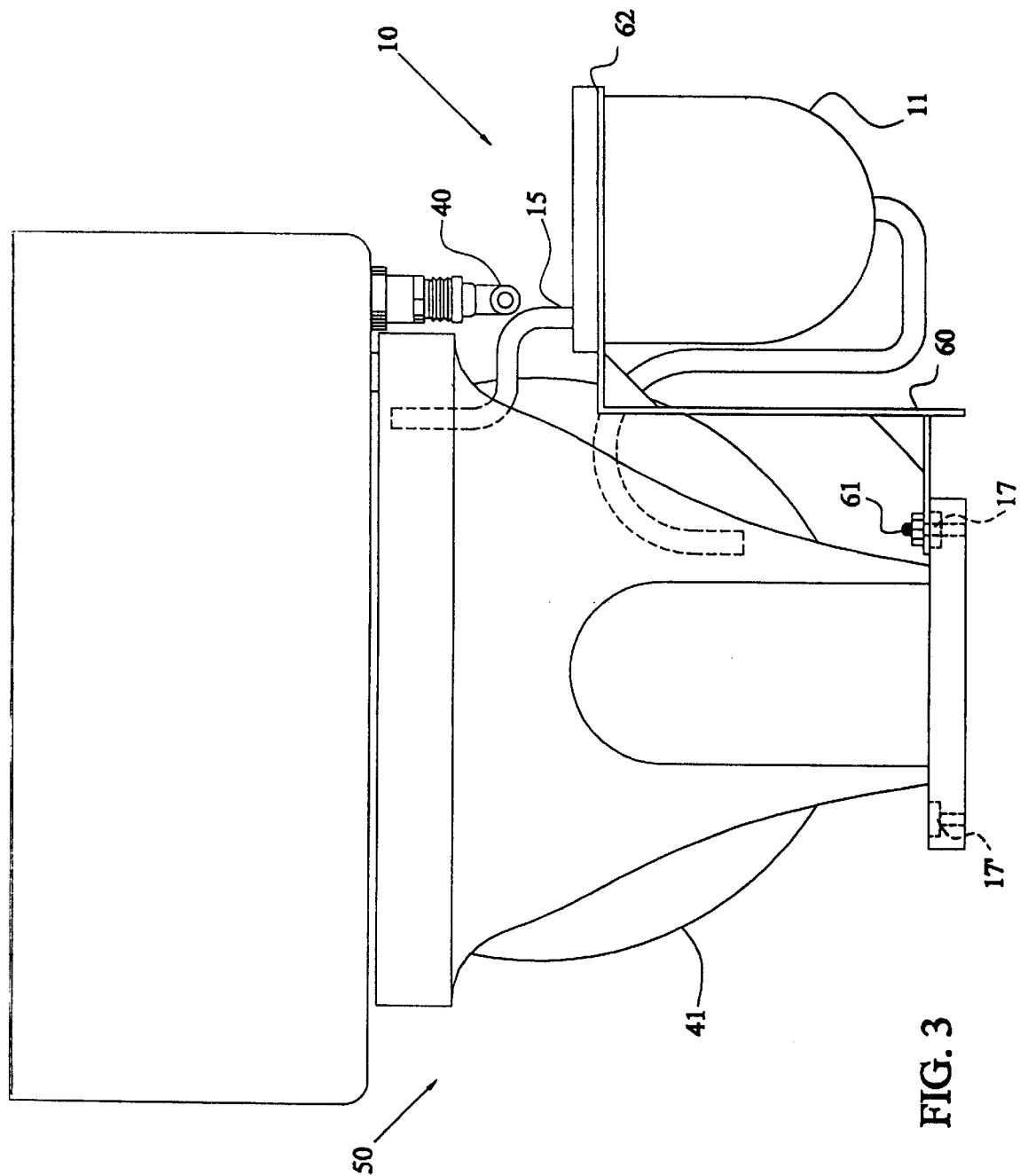
FIG. 3 is a rear of a second embodiment in accordance with the invention.

FIG. 3 shows a possible method of attaching watering device 10, by attachment means 61, to bowl 17. Vertical support 60 and horizontal support 62 are shown here beneath a lip on watering device 10.

The instant invention lends itself to adaptation to different toilet configurations and styles by reason of its mountability using a variety of possible attachment means and by the wide availability of flexible and non flexible tubing and sealing adhesives by which said tubing can be affixed in position between said watering device 10 and the toilet installation being used.

While the above description constitutes preferred embodiments of the present invention, it will be appreciated that the invention is susceptible to modifications, variation and change without departing from the proper scope and fair meaning of the accompanying claims.

What is claimed is:

1. An automatic pet watering device installed on the toilet bowl of a conventional toilet, said watering device consisting of:

a water inlet and water outlet means in communication with an external water source, and having outlet means, a toilet bowl having a top cap connected to said outlet means, for releasing water from said water source, a hollow tube extending from said top cap and above the water line of said toilet bowl and through said toilet bowl for conducting water from said source, said hollow tube having an end portion bent in a downward position, a water bowl located near said toilet bowl and below said hollow tube end portion, said water bowl having an open end and a bottom end, a first end of a water tube connected to said bottom end of said water bowl and a second end extending vertically and connected through said toilet bowl and bent downwardly to a point below the water line of said toilet bowl, whereby flushing said toilet automatically fills said water bowl and simultaneously empties a quantity of water.

2. An automatic pet watering device of claim 1 wherein said water bowl is located near a side of said toilet bowl and fastened to said toilet bowl with a vertical support and a horizontal support.

* * * * *